(12) United States Patent
Talavasek

(10) Patent No.: US 9,708,027 B2
(45) Date of Patent: Jul. 18, 2017

(54) BRAKE LEVER WITH DETACHABLE BALL END

(75) Inventor: Jan Talavasek, Knonau (CH)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 794 days.

(21) Appl. No.: 13/422,768

(22) Filed: Mar. 16, 2012

(65) Prior Publication Data

US 2013/0241173 A1    Sep. 19, 2013

(51) Int. Cl.
*B62K 23/06* (2006.01)

(52) U.S. Cl.
CPC ......... *B62K 23/06* (2013.01); *Y10T 29/49826* (2015.01); *Y10T 74/20612* (2015.01)

(58) Field of Classification Search
CPC ............. B62K 23/06; Y10T 74/20612; Y10T 29/49826
USPC .......... 280/281.1, 279; 74/551.8, 502.3, 489, 74/558.5, 502.2
See application file for complete search history.

(56) References Cited

U.S. PATENT DOCUMENTS

| | | | |
|---|---|---|---|
| 3,803,941 A | 4/1974 | Yoshikawa | |
| 4,200,001 A * | 4/1980 | Kytta | B60T 13/52 74/478 |
| 5,052,241 A * | 10/1991 | Nagano | B62K 23/06 74/473.13 |
| 5,094,120 A * | 3/1992 | Tagawa | B62M 25/04 74/141.5 |
| 5,299,466 A | 4/1994 | Heilbron et al. | |
| 5,392,669 A | 2/1995 | Li | |
| 5,549,017 A | 8/1996 | Lin | |
| 5,584,210 A * | 12/1996 | Gelbein | B62K 23/06 403/110 |
| 5,775,168 A * | 7/1998 | Furuta | B62K 23/02 74/489 |
| 7,243,771 B2 * | 7/2007 | Shanahan | 192/99 S |
| 7,437,969 B2 * | 10/2008 | Ose | B62M 25/04 74/501.6 |

(Continued)

FOREIGN PATENT DOCUMENTS

| | | |
|---|---|---|
| DE | 9206732 | 7/1992 |
| DE | 202007007755 | 7/2007 |
| DE | 202011000417 | 6/2011 |

*Primary Examiner* — Joseph Rocca
*Assistant Examiner* — Marlon A Arce
(74) *Attorney, Agent, or Firm* — Michael Best & Friedrich LLP

(57) ABSTRACT

A bicycle comprising a frame, front and rear wheels supporting the frame, and a brake lever assembly including a brake lever and an end cap. The brake lever has a pivot portion, a gripping portion defining a gripping length, and a free end defining an end width. The end cap is detachably secured to the free end and defines a cap width larger than the end width. The end cap has a maximum dimension that is less than the gripping length and is preferably substantially symmetrical (e.g., spherical) around the free end. The brake lever assembly can include a fastener securing the end cap to the free end. For example, the fastener can thread through the end cap and engage the brake lever. In order to enhance securing the end cap to the free end, the end cap can include a recess that is dimensioned to receive the free end.

21 Claims, 5 Drawing Sheets

(56) References Cited

U.S. PATENT DOCUMENTS

| | | | | |
|---|---|---|---|---|
| 7,762,157 | B2* | 7/2010 | Kawakami | B62K 23/06 74/473.14 |
| 8,555,754 | B2* | 10/2013 | Chen | B25B 7/06 81/416 |
| 8,596,727 | B2* | 12/2013 | Montague | B62K 25/02 280/279 |
| 2002/0078789 | A1 | 6/2002 | Chen | |
| 2003/0066320 | A1* | 4/2003 | Vito | B62H 5/00 70/233 |

* cited by examiner

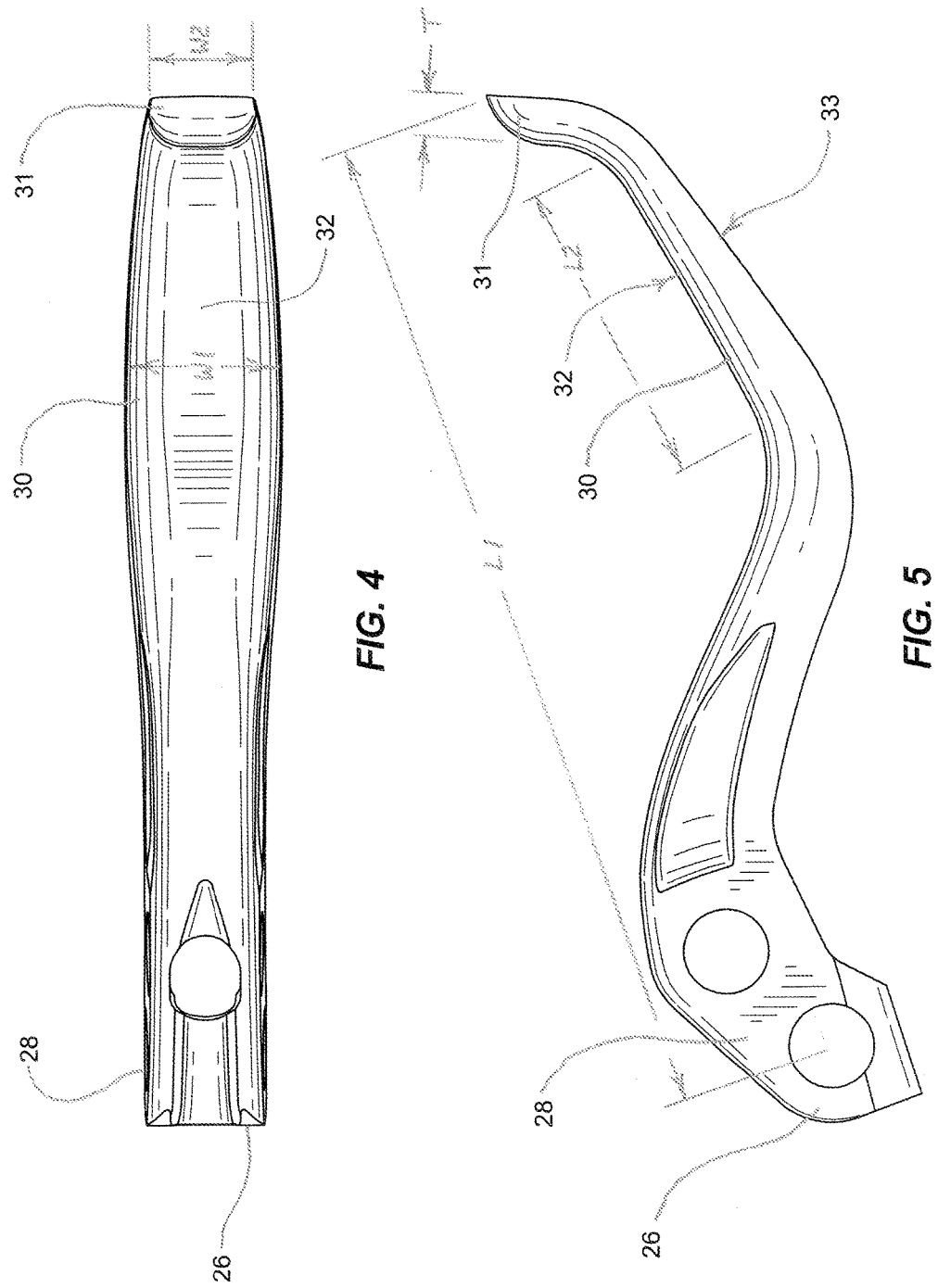

BRAKE LEVER WITH DETACHABLE BALL END

BACKGROUND

The present invention relates to brake levers, such as can be used to actuate a brake of a moving vehicle like a bicycle.

Certain governmental regulations require that certain exposed protrusions on a bicycle, such as brake levers, terminate with a radius of at least 6.3 mm. Such a regulation is intended to eliminate or reduce the number of sharp protrusions on the bicycle.

SUMMARY

Governmental regulations can vary between countries and can also vary based on the type of bicycle. For example, some countries might have the above-reference regulation for electric bicycles and not for standard, non-powered bicycles, due to the different maximum speed achieved by the different types of bicycles.

It would be desirable for a manufacturer of bicycles to be able to convert brake levers that do not have large-radius ends to a brake lever that has large-diameter ends. The present invention provides such a brake lever.

The invention can be embodied in a bicycle comprising a frame, front and rear wheels supporting the frame, and a brake lever assembly. The brake lever assembly includes a brake lever and an end cap. The brake lever has a pivot portion, a gripping portion defining a gripping length, and a free end defining an end width. The end cap is detachably secured to the free end and defines a cap width larger than the end width. The end cap has a maximum dimension that is less than the gripping length and is preferably substantially symmetrical (e.g., spherical) around the free end.

In one embodiment, the brake lever assembly further comprises a fastener securing the end cap to the free end. For example, the fastener can thread through the end cap and engage the brake lever. In order to enhance securing the end cap to the free end, the end cap can include a recess that is dimensioned to receive the free end.

In order limit interference with other operations of the bicycle, the maximum dimension of the end cap is preferably less than 40% (e.g., less than 36% or less than 33%) of the gripping length. In addition, the maximum dimension of the end cap is preferably less than 20% (e.g., less than 15% or less than 10%) of the lever length (measured from the pivot point to the free end).

Other aspects of the invention will become apparent by consideration of the detailed description and accompanying drawings.

BRIEF DESCRIPTION OF THE DRAWINGS

FIG. 4 is a front view of the brake lever of FIG. 3.

FIG. 5 is a side view of the brake lever of FIG. 4.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
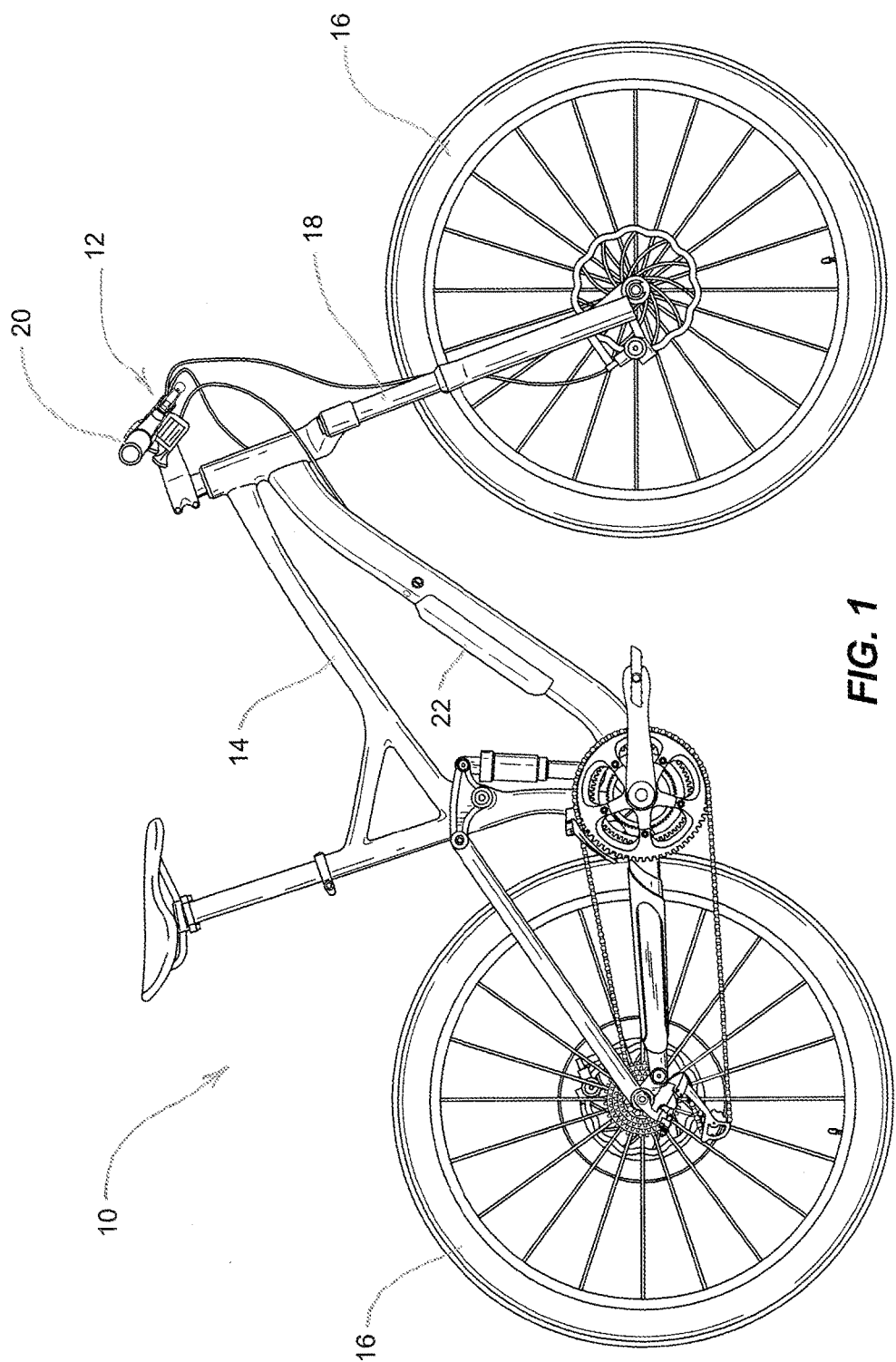
FIG. 1 is a side view of a bicycle having a brake lever embodying the present invention.

FIG. 1 illustrates an electric bike 10 that includes a brake lever assembly 12 embodying the present invention. The bike 10 includes a frame 14, two wheels 16, a front fork 18, handlebars 20, and a battery 22 for powering the bike 10.

Figure 2:
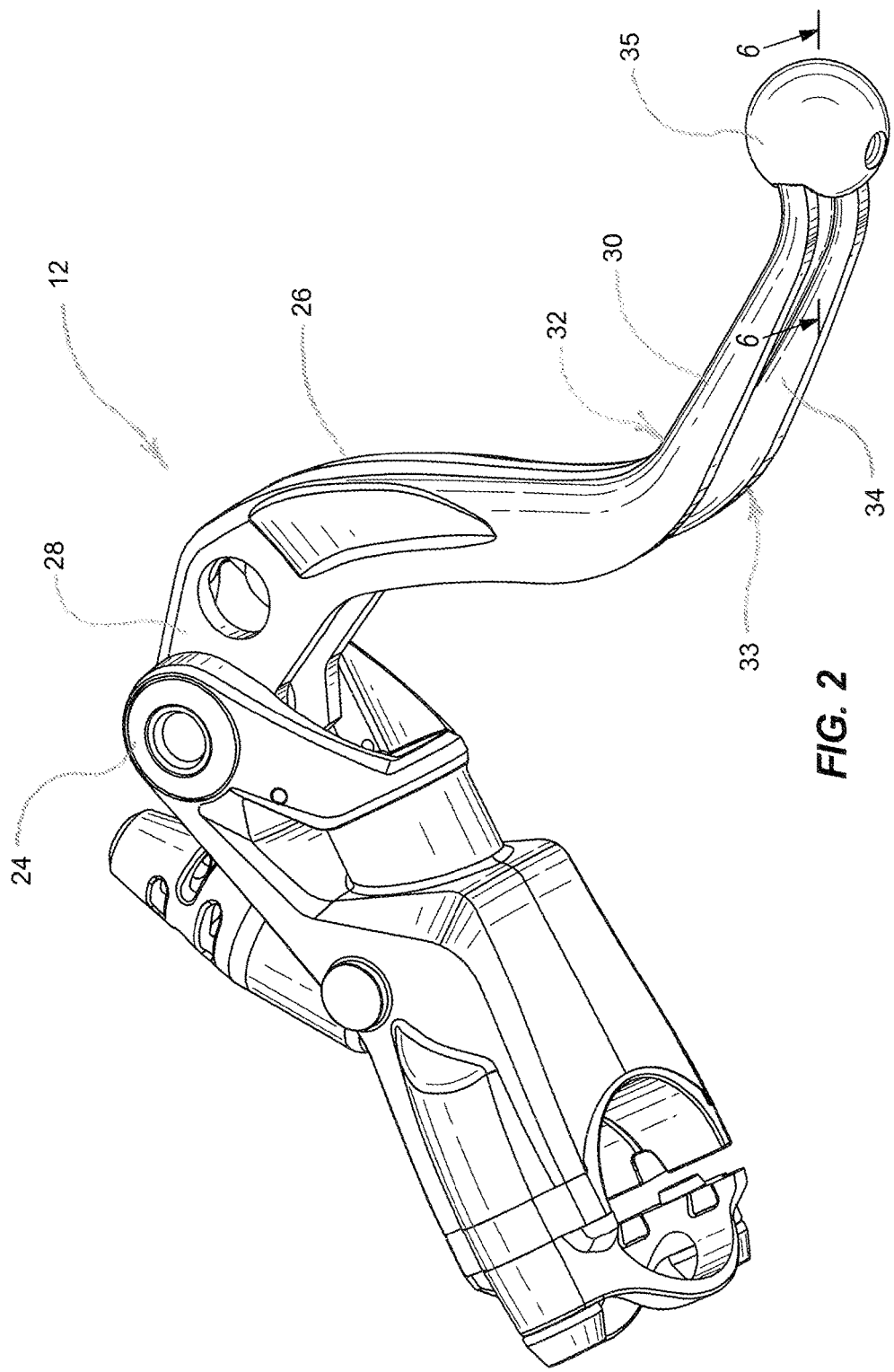
FIG. 2 is a perspective view of the brake lever assembly on the bicycle of FIG. 1.
Figure 3:
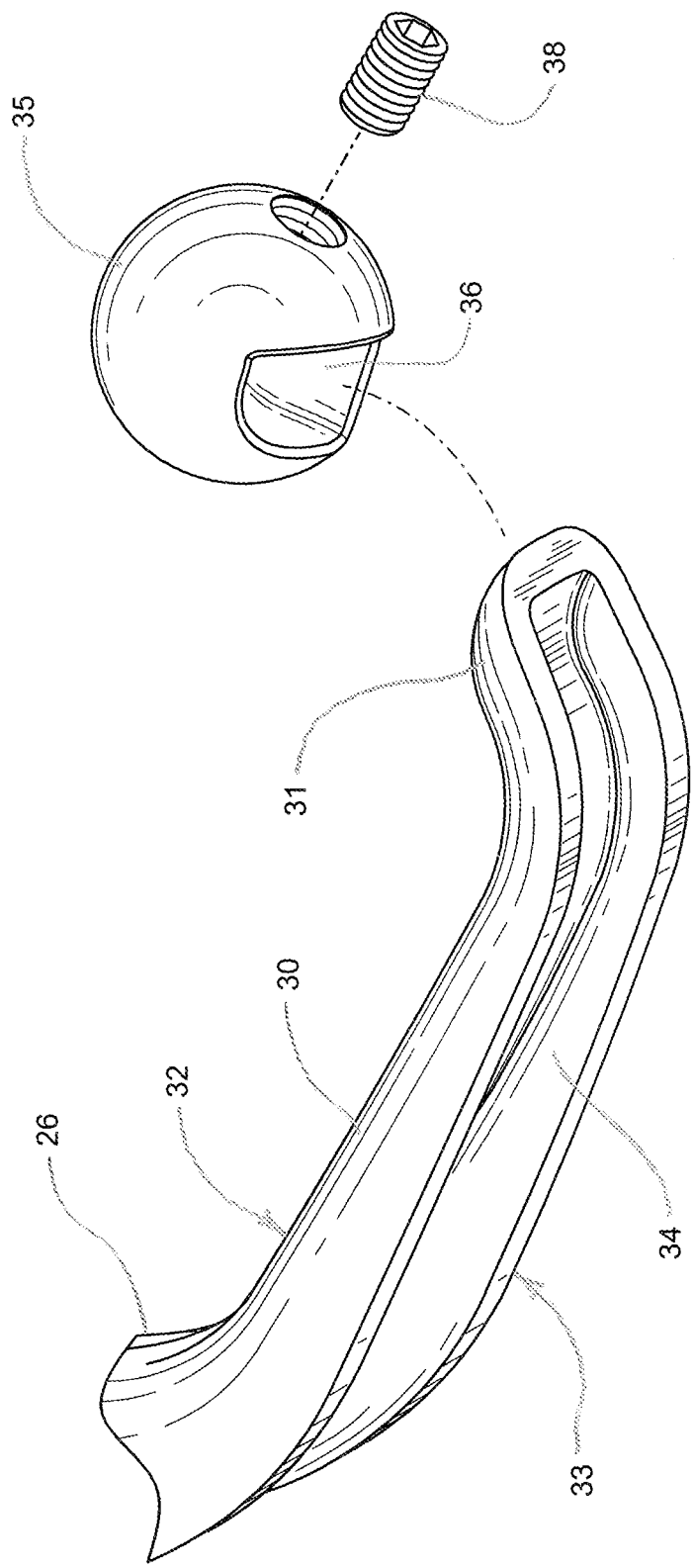
FIG. 3 is an exploded view of the brake lever assembly of FIG. 2, including a brake lever and an end cap.
Figure 6:
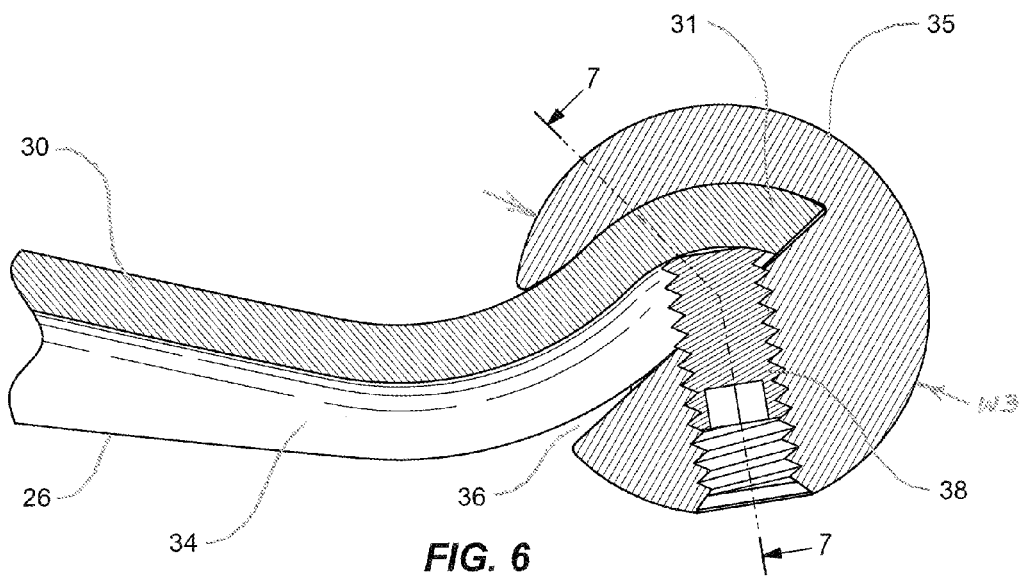
FIG. 6 is a section view taken along line 6-6 in FIG. 2.
Figure 7:
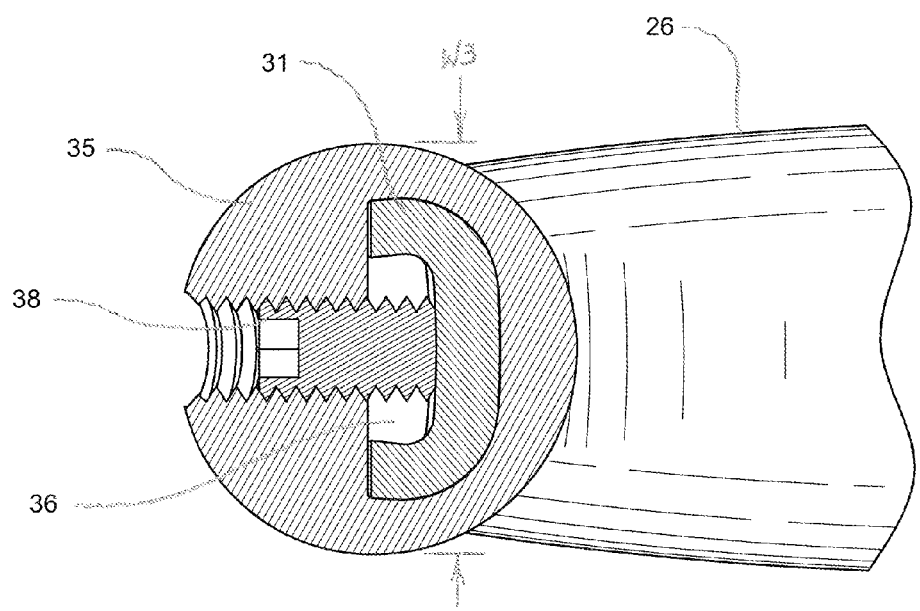
FIG. 7 is a section view taken along lone 7-7 in FIG. 6.

Referring to FIGS. 2 and 3, the brake lever assembly 12 includes a brake mount 24 and a brake lever 26 that is a standard brake lever that does not have a large-radius end. More specifically, the brake lever 26 includes a pivot portion 28 for pivotal attachment to a brake mount 26, a gripping portion 30 adapted to be engaged by the user, and a free end 31 that is no larger than the gripping portion 30. The brake lever 26 defines a front side 32 for engagement by a user's fingers, and a rear side 33 opposite the front side 32. The rear side 33 of the brake lever 26 includes a recessed groove 34. The brake lever 26 has a lever length L1 of 156 mm from the pivot point 28 to the free end 31. The gripping portion 30 has a gripping length L2 of 47 mm and has a grip width W1 of 24 mm. The free end 31 has an end width W2 of 11 mm and an end thickness T of 5 mm. This type of brake lever is commonly used on standard, non-powered bicycles.

The brake assembly 12 further includes an end cap 35 that is detachably secured to the free end 31 of the brake lever 26. The end cap 35 has a cap width W3 that is larger than both the grip width W1 and the end width W2. The end cap 35 has a maximum dimension (in the illustrated embodiment, the maximum dimension is the cap width W3) that is less than the gripping length L2 and substantially less than the lever length L1. The illustrated end cap 35 is in the shape of a sphere having a diameter of 15 mm and is substantially symmetrically arranged around the free end 31. As a result of this arrangement, the end cap 34 increases both the width W2 and thickness T dimensions of the free end 31. The maximum dimension of the illustrated end cap 34 (i.e., width W3) is about 9.6% of the lever length L1 (i.e., 15 mm/156 mm), and is about 31.9% of the gripping length L2 (i.e., 15 mm/47 mm).

The end cap 35 includes a D-shaped recess 36 shaped to receive the free end 31 of the brake lever 26. A fastener in the form of a set screw 38 is threaded through a portion of the end cap 35 and secures the end cap 35 to the free end 31.

To install the end cap 35 onto the free end 31 of the brake lever 26, the recess 36 in the end cap 35 is aligned with the free end 31 with the set screw 38 positioned on a rearward side of the brake lever 26. The end cap 35 is then slid onto the brake lever 26 until the free end 31 is seated in the recess 36. The set screw is then rotated clockwise until it enters the recessed groove 34 and firmly contacts the rear side 33 of the brake lever 26 to thereby secure the end cap 35 onto the free end 31 of the brake lever 26.

It should be understood that there are other ways the practice certain aspects of the present invention. For example, the end cap can be made in two semi-spherical halves that are sandwiched onto the free end. In that embodiment, the fastener could extend through one half pg the end cap and thread into the other half of the end cap without contacting the free end. It is also possible to resiliently secure the end cap onto the free end. For example, the end cap can be held onto the free end by a resilient or biased member, or the end cap can be made of a resilient material that grips the free end and inhibits removal of the end cap from the free end. It any of these embodiments, it would be desirable to have a portion of the end cap or corresponding fastener positioned in the recessed groove 34 on the rear side 33 of the brake lever 26.

Thus, the invention provides, among other things, a brake lever assembly that can be converted from a standard lever to a lever having a large-radius end to thereby facilitate use of the lever for both standard biked and electric bikes. In addition, the present invention makes it possible to change the end cap of a brake lever in the event that the end cap is damaged, such as can occur if the bike tips over and hits the ground.

The invention claimed is:

1. A bicycle comprising:
   a frame;
   front and rear wheels supporting the frame; and
   a brake lever assembly including:
      a brake lever having a pivot portion, a gripping portion defining a gripping length, and a free end defining an end width, wherein the brake lever defines a lever length from a center of the pivot portion to the free end; and
      an end cap detachably secured to the free end, wherein the end cap defines a cap width larger than the end width, and wherein the end cap defines a maximum dimension that is less than the gripping length.

2. A bicycle as claimed in claim 1, wherein the brake lever assembly further comprises a fastener securing the end cap to the free end.

3. A bicycle as claimed in claim 2, wherein the fastener threads through the end cap and engages the brake lever.

4. A bicycle as claimed in claim 1, wherein the end cap is substantially symmetrical around the free end.

5. A bicycle as claimed in claim 1, wherein the end cap is substantially spherical in shape.

6. A bicycle as claimed in claim 1, wherein the end cap defines a recess, and wherein the free end is positioned in the recess.

7. A bicycle as claimed in claim 1, wherein the maximum dimension is less than 40% of the gripping length.

8. A bicycle as claimed in claim 1, wherein the maximum dimension is less than 20% of the lever length.

9. A brake lever assembly comprising:
   a brake lever having a pivot portion, a gripping portion having a gripping length, and a free end having an end width, wherein the brake lever has a length from a center of the pivot portion to the free end; and
   an end cap detachably secured to the free end, wherein the end cap has a cap width larger than the end width, and wherein the end cap has a maximum dimension that is less than the gripping length.

10. A brake lever assembly as claimed in claim 9, further comprising a fastener securing the end cap to the free end.

11. A brake lever assembly as claimed in claim 10, wherein the fastener threads through the end cap and engages the brake lever.

12. A brake lever assembly as claimed in claim 9, wherein the end cap is substantially symmetrical around the free end.

13. A brake lever assembly as claimed in claim 9, wherein the end cap is substantially spherical in shape.

14. A brake lever assembly as claimed in claim 9, wherein the end cap includes a recess, and wherein the free end is positioned in the recess.

15. A brake lever assembly as claimed in claim 9, wherein the maximum dimension is less than 40% of the gripping length.

16. A brake lever assembly as claimed in claim 9, wherein the maximum dimension is less than 20% of the lever length.

17. A method of assembling a brake lever assembly comprising:
   providing a brake lever including a gripping portion having a gripping length, and a free end having an end width; and
   providing an end cap having a cap width larger than the end width, and a maximum dimension that is less than the gripping length; and
   securing the end cap onto the free end of the brake lever.

18. A method as claimed in claim 17, wherein a fastener is supported by the end cap, and wherein securing includes moving the fastener relative to the end cap.

19. A method as claimed in claim 18, wherein the fastener threads through the end cap, and wherein moving includes rotating the fastener until the fastener firmly engages the brake lever.

20. A method as claimed in claim 17, wherein the end cap includes a recess, and wherein securing includes inserting the free end into the recess.

21. A brake lever assembly comprising:
   a brake lever having a pivot portion, a gripping portion, and a free end having an end width; and
   an end cap detachably secured to the free end, wherein every dimension of the end cap is larger than any end width of the lever.

* * * * *